United States Patent Office 3,504,937
Patented Apr. 7, 1970

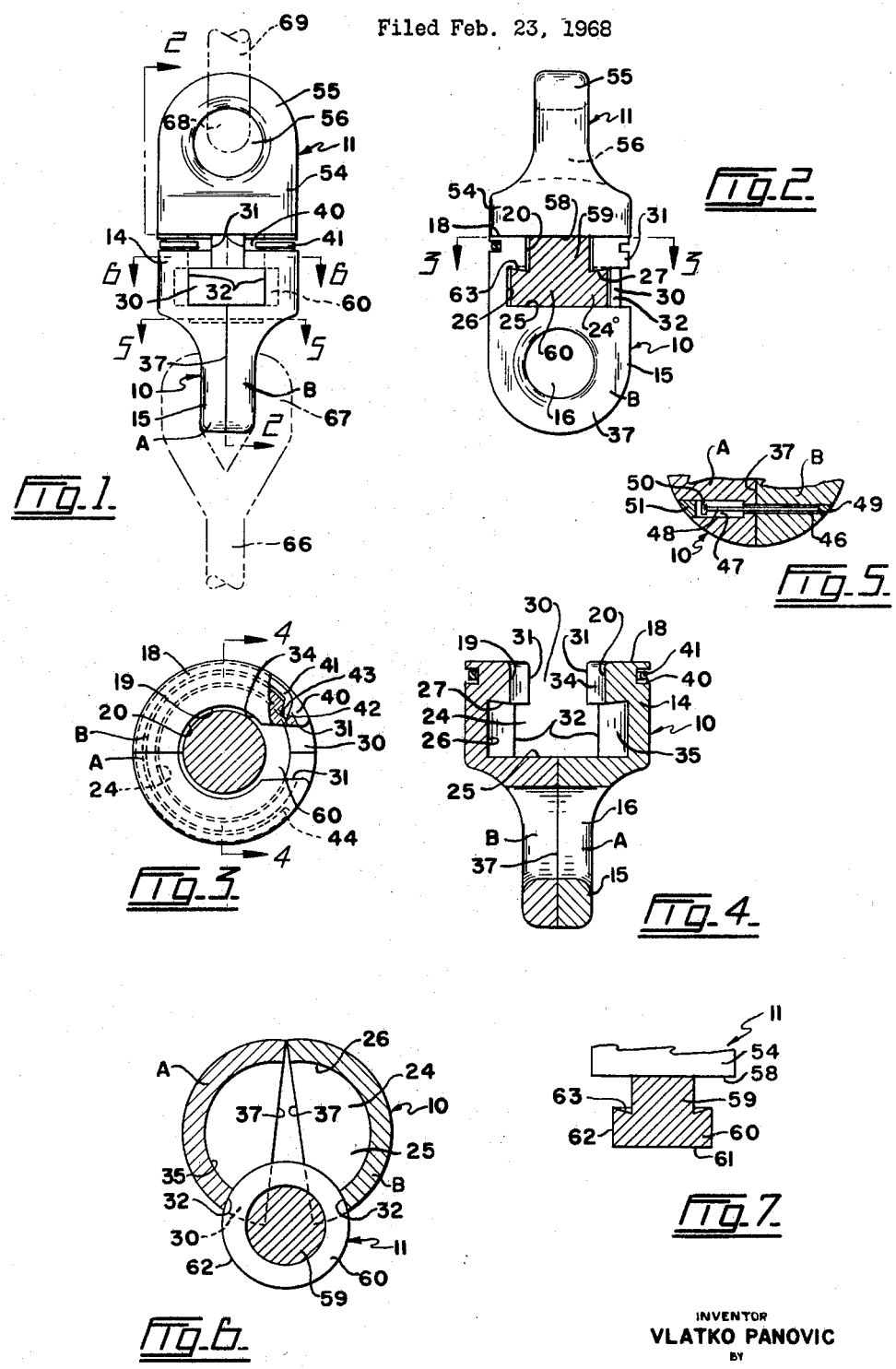

3,504,937
SNAP LOCK SWIVEL CONNECTOR
Vlatko Panovic, Burnaby, British Columbia, Canada, assignor to Dynamic Tools Ltd., Vancouver, British Columbia, Canada, a corporation of Canada
Filed Feb. 23, 1968, Ser. No. 707,502
Claims priority, application Canada, Apr. 29, 1967, 989,210
Int. Cl. F16b 7/00; F16c 11/06; B25g 3/38
U.S. Cl. 287—91                               4 Claims

ABSTRACT OF THE DISCLOSURE

A device having self-clamping parts capable of being snap-coupled together to provide a swivel connection for two cable ends.

BACKGROUND OF THE INVENTION

This invention relates to a connector particularly adapted for use in joining together lengths of cable or the like.

In the fishing, logging, construction and other industries there is a great demand for a connector which can be operated quickly and easily to join one length of cable to another. The device must be such that the cable lengths can be disconnected with the same ease and speed and, of course, it must be able to support any load which the connected cables are likely to be subjected to and to withstand the considerable amount of rough usage likely to be encountered in any one of the above mentioned industries. Another important requirement of the connector particularly when in use on a fish boat for example, is the need to be able to pass through fairleads, over cable blocks and around winches without becoming uncoupled since to do so could easily result in serious injury to a member of the crew or the loss of a valuable net and catch as well as other equipment.

SUMMARY OF THE INVENTION

I have found that these requirements of a cable connector, as well as others which will be made apparent later, are fulfilled by the present device which provides means whereby the two parts of the connector can be snapped together by a simple lateral, twisting motion. No special tools are required to couple or uncouple the connector and both operations can be done in a matter of seconds. There are no loose parts on the connector which can be dropped and perhaps lost. The rounded and unobstructed sides of the connector enable it to move through a pulley block for example, without snagging or coming apart. Perhaps the most important feature or advantage of my cabled connector is the means provided whereby the connected parts are clamped together with a force which is proportionate to any load imposed upon the connected cable length so that there is no danger of the coupling coming apart under load.

BRIEF DESCRIPTION OF THE DRAWING

FIGURE 1 is a side elevation of the connector,
FIGURE 2 is a section taken on the line 2—2 of FIGURE 1,
FIGURE 3 is an enlarged section taken on the line 3—3 of FIGURE 2,
FIGURE 4 is a section taken on the line 4—4 of FIGURE 3,
FIGURE 5 is a fragmentary detailed section, taken on the line 5—5 of FIGURE 1, and showing the retainer means,
FIGURE 6 is a detailed section, taken on the line 6—6 of FIGURE 1, and showing the two parts of the connector as they appear when being coupled or uncoupled, and
FIGURE 7 is a fragmentary view, partly in section, showing the inclined shoulder on the knob.

DESCRIPTION OF THE PREFERRED EMBODIMENTS

The connector illustrated comprises two releasably connected parts 10 and 11, both preferably formed of heavy metal castings which will give the device the required strength and durability.

Connector part 10 has a cylindrical body 14 and a reduced outer end 15 in which a transversely extending eye 16 is formed. Inner face 18 of part 10 is disposed at right angles to the longitudinal axis of said part and is provided with a centrally disposed opening 19. The numeral 20 designates a circular sidewall of opening 19, this wall being parallel to the longitudinal axis of part 10. Opening 19 extends into and is longitudinally aligned with a recess 24 formed in the cylindrical body between the eye 16 and the face 18. Recess 24 has a plane outer wall 25, a sidewall 26 which is circular and also parallel to the longitudinal axis of part 10, and an inner wall which provides the body 14 with an annular seat 27. Walls 25 and 26 are normal to one another but the annular seat 27 is disposed at an acute angle to the wall 26. I have found that seat 27 should be inclined at an angle of approximately 80 degrees relative to the wall 26 for best results.

Near face 18, the cylindrical body 14 has a slot 30 which extends through a side of said body to communicate with both opening 19 and recess 24. As viewed in FIGURE 1, the slot 30 is an inverted T-shaped opening having opposing sides 31 and 32. The spacing between the two opposing sides 31 is less than the diameter of the wall 20 while the spacing between the two opposing sides 32 is less than the diameter of the wall 26. Thus, the cylindrical body 14 is provided with stops 34 and 35 which partially close off access to the opening 19 and recess 24 from the side of said body as shown best in FIGURE 4.

The connector part 10 is divided longitudinally into two equal sections which are indicated by the letters A and B. These sections have abutting faces which are both indicated by the numeral 37, the abutting faces being located on a plane extending through the centres of the opening 19, the recess 24 and the slot 30. In order to keep the sections A and B together with their faces 37 contacting one another, the body 10 is provided with a rectangular groove 40 which encircles said body near the face 18. Fitted to the groove 40, is a ring 41 of spring steel. One end 42 of this ring is inserted into an aperture 43 (FIGURE 3) so as to anchor said ring to the body 10 while the opposite end 44 of the ring is free to move endwise in the groove.

Referring now particularly to FIGURE 5, it will be seen that the body 10 is drilled to provide a hole 46 which extends through sections A and B at right angles to their abutting faces 37. Hole 46 is counterbored through section A to form a chamber 47. A flexible retainer pin 48 is suitably secured in the section B end of the hole 46 as at 49. The retainer pin extends into chamber 47 and has a head 50 which has limited endwise movement within said chamber. Preferably, the outer end of the chamber 47 is sealed by a suitable closure 51.

Part 11 of the connector has a cylindrical body 54 of the same diameter as body 14 and an outer end 55 which is reduced in thickness in the same manner and to the same extent as the corresponding end of part 10. End 55 is provided with a transverse eye 56. The opposite or inner end 58 of part 11 is also disposed at right angles to the longiutdinal axis of the part and is provided with a centrally disposed stem 59. The cylindrical stem 59 terminates in an integrally formed knob 60. As shown best in FIGURE 7, the knob 60 has a plane end face 61, a circular side edge 62 and an inner face or shoulder 63. Shoulder 63 is disposed at an 80 degree angle to the side edge 62 or, in other words, is at an angle of 80 degrees to the longitudinal axis of part 11. Thus, the angle of shoulder 63 corresponds to that of the annular seat 27 of the cylindrical body 10.

The connector is particularly adapted for use in coupling together the ends of two cables or the like. As shown in FIGURE 1, one cable 6 has an end 67 which is looped through the eye 16 and is then spliced to the cable in a conventional manner. An end 68 of the other cable 69 is similarly secured to the eye 56 of the connected part 11.

To fasten the two cable ends together by means of the connector, parts 10 and 11 are placed alongside one another with the end faces 18 and 58 level with one another and the knob 60 in contact with the ends of the opposing sides 32 of the slot 30. Sections A and B are pried apart slightly as shown in FIGURE 6 and sidewise pressure is applied particularly to part 11 to force the knob 60 between the opposing sides 32 of the slot, the cylindrical stem 59 entering between the sides 31 of the slot as this transverse movement of the knob takes place. As sections A and B are thus spread apart, the resilient ring 41 is expanded and the head 50 of the retainer pin 48 is moved to the innermost end of chamber 47 whereupon no further spreading movement of sections A and B can take place. Continued lateral movement of the parts 10 and 11 will place these parts in alignment with one another so that the knob 60 is lodged in the recess 24 with the stem 59 projecting through the opening 19. As the knob and stem reach this position, the ring 41 snaps the sections A and B together to lock the knob within the recess 24 and the stem within the opening 19. The two connected parts are now secured together as a unit and are free to rotate or swivel relative to one another about the longitudinal axis of the connector. The knob 60 is prevented from moving laterally through the slot 30 by means of the stops 35 and similar movement of the stem 59 is halted by the stops 34.

When tension is applied to the cables 66 and 69, the inclined shoulder 63 and correspondingly inclined annular seat 27 coact to exert inwardly directed pressure upon the sections A and B. When sections A and B are clamped together in this manner, there is no possibility of the knob 60 and stem 59 moving transversely through the slot 30.

To disconnect the cables coupled together by the connector, sections A and B are again spread apart as shown in FIGURE 6 and at the same time, parts 10 and 11 are moved transversely of one another so that the knob and stem pass through the slot 30. Thus, the two parts A and B are readily connected together and are just as easily disconnected. The retainer pin 48 ensures that the sections A and B are only spread apart far enough to allow the knob 59 to be lodged in or removed from the recess 24 through the side slot 30. By placing a limit on the extent to which the sections A and B can be spread apart, the resilient ring 41 cannot be expanded to a point where the two sections making up connector part 10 might be caused to fly apart.

From the foregoing, it will be seen that there is no likelihood of the two parts of the connector becoming separated as long as the cables are under tension. By virtue of the inclined seat 27 and shoulder 63, sections A and B are always clamped together with a force which is directly proportional to the load imposed upon the connected cable. Thus, the connector can pass through fairleads and over winding drums without breaking apart as long as cabled tension is maintained which normally would be the case. Should tension ever be taken off the cables, the compressive force applied by the ring 41 will be found to be sufficient to keep the sections A and B together so that the connector parts 10 and 11 cannot become accidentally separated.

I claim:
1. A connector comprising a first body having an end face and a circular recess adjacent thereto, said end face having a central opening communicating with the recess, said first body having a side slot providing access to the recess and central opening and being divided longitudinally into two separable sections each having equal portions of said side slot, recess and central opening, said two sections having abutting faces normal to the end face, a seat within the first body between the recess and the central opening, said first body having an encircling groove near the end face, a resilient C-shaped ring seated in the groove to resist separation of the two sections, a second body having an end face, a stem projecting from the end face, a knob on the stem, a shoulder on the knob adapted to engage the seat when the knob and stem are entered laterally through the side slot into the recess and central opening, said two sections expanding the C-shaped ring and hinging about the edges of the abutting surfaces of the sections substantially diametrically opposite the side slot a point of contact formed by the abutting faces as said sections are expanded to allow the knob and stem to traverse the side slot, said shoulder and seat being inclined at an angle to the aligned longitudinal axes of the first and second bodies whereby to exert an inwardly directed clamping force on the two sections when said first and second bodies are pulled in opposite directions, said first body having opposing stops between the recess and the side slot, said opposing stops retaining the knob within the recess until the two sections are separated.

2. A connector as claimed in claim 1, in which said first body has opposing stops between the central opening and the side slot, said opposing stops preventing passage of the stem laterally through the side slot until the two sections are separated.

3. A connector as claimed in claim 1, and including a cable receiving eye on an end of each of the first and second bodies opposite said end face thereof.

4. A connector as claimed in claim 1, and including a pin extending between the two sections of the first body, said pin having one end anchored to one of the two sections and an opposite end moveably mounted in the other of said two sections, and means for limiting movement of the opposite end of the pin.

References Cited

UNITED STATES PATENTS

| 534,165 | 2/1895 | Lee | 287—91 X |
| 1,449,765 | 3/1923 | McLaughlin | 287—91 X |
| 1,831,765 | 11/1931 | Gouverneur | 287—111 |

REINALDO P. MACHADO, Primary Examiner

W. L. SHEDD, Assistant Examiner

U.S. Cl. X.R.
287—87, 124